United States Patent
Weber

(10) Patent No.: US 12,332,635 B2
(45) Date of Patent: Jun. 17, 2025

(54) METHOD FOR DYNAMICALLY COMPENSATING ANGLE ERRORS WHEN OPERATING A MACHINE TOOL, AND A MACHINE TOOL OPERABLE WITH SUCH A METHOD

(71) Applicant: Schwäbische Werkzeugmaschinen GmbH, Schramberg-Waldmössingen (DE)

(72) Inventor: Stefan Weber, Bösingen (DE)

(73) Assignee: SCHWÄBISCHE WERKZEUGMASCHINEN GMBH, Schramberg-Waldmössingen (DE)

( * ) Notice: Subject to any disclaimer, the term of this patent is extended or adjusted under 35 U.S.C. 154(b) by 476 days.

(21) Appl. No.: 17/930,863

(22) Filed: Sep. 9, 2022

(65) Prior Publication Data

US 2023/0097012 A1 Mar. 30, 2023

(30) Foreign Application Priority Data

Sep. 13, 2021 (EP) .................................. 21196271

(51) Int. Cl.
*G05B 19/418* (2006.01)

(52) U.S. Cl.
CPC ... *G05B 19/41825* (2013.01); *G05B 19/4187* (2013.01)

(58) Field of Classification Search
CPC .......... G05B 19/41825; G05B 19/4187; G05B 2219/41206; G05B 2219/49169; G05B 2219/49182; G05B 2219/49186; G05B 2219/49193; G05B 2219/49198; G05B 19/402; G05B 19/404; B23B 49/00
See application file for complete search history.

(56) References Cited

U.S. PATENT DOCUMENTS

| | | | |
|---|---|---|---|
| 4,310,269 A | 1/1982 | Neu et al. | |
| 8,818,549 B2* | 8/2014 | Yamada | G05B 19/416 409/209 |

(Continued)

FOREIGN PATENT DOCUMENTS

DE 10 2017 121272 3/2019

OTHER PUBLICATIONS

European Search Report issued for European Application No. 21196271.7, Feb. 14, 2022, 4 pages.

(Continued)

*Primary Examiner* — Christopher E. Everett
(74) *Attorney, Agent, or Firm* — HSML P.C.

(57) ABSTRACT

A method for dynamically compensating angle errors when operating a machine tool that includes at least one fixture for a workpiece, in or on which a workpiece can be secured, at least one toolholder, in or on which a tool, in particular a drill, can be secured and can be rotationally driven by a rotational drive of the toolholder. The rotational drive including at least one horizontal drive by which the toolholder—for purposes of machining the workpiece—can execute movements in at least one horizontal plane of the machine tool. The machine tool further includes at least one vertical drive by which the toolholder can execute movements in a vertical direction of the machine tool, and at least one controller to which the rotational drive, the horizontal drive, and the vertical drive are functionally assigned.

14 Claims, 1 Drawing Sheet

(56) References Cited

U.S. PATENT DOCUMENTS

Figure 1:
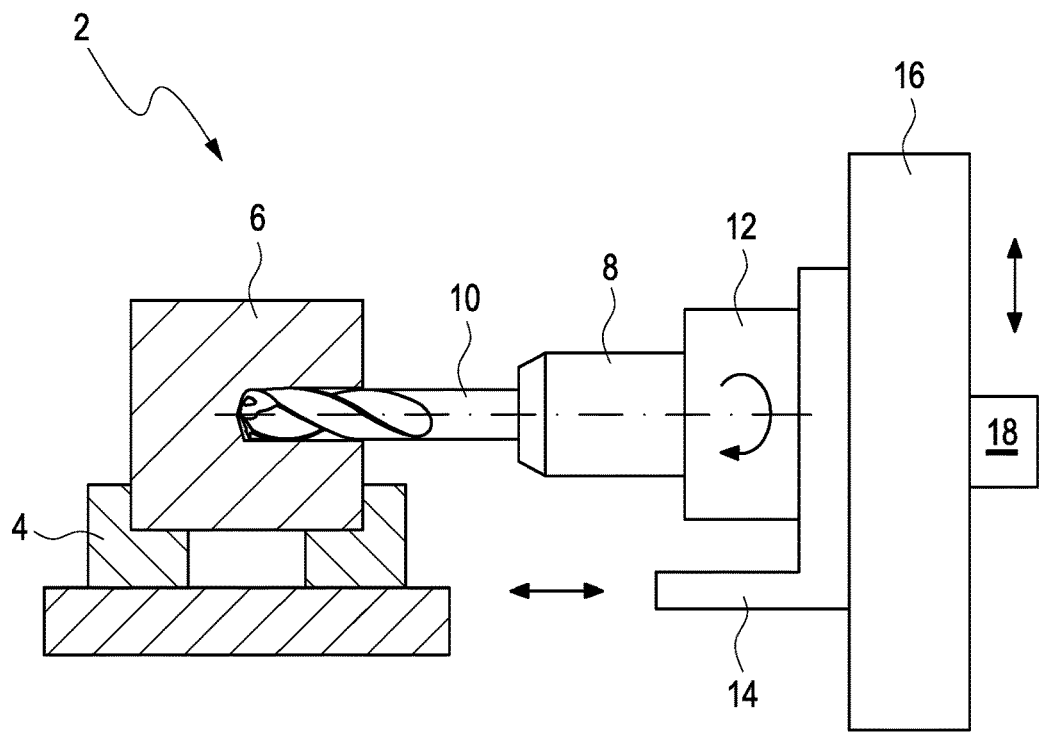

| | | | | |
|---|---|---|---|---|
| 2005/0113963 A1* | 5/2005 | Cho | ........................ | G05B 19/19 |
| | | | | 700/188 |
| 2008/0114485 A1* | 5/2008 | Katoh | ................... | G05B 19/404 |
| | | | | 700/193 |
| 2010/0286813 A1* | 11/2010 | Yamada | .............. | G05B 19/4163 |
| | | | | 700/174 |
| 2011/0044778 A1* | 2/2011 | Yamada | ................ | G05B 19/416 |
| | | | | 409/80 |
| 2012/0323373 A1* | 12/2012 | Sato | ..................... | G05B 19/404 |
| | | | | 700/275 |

OTHER PUBLICATIONS

European Examination Report issued for European Application No. 21196271.7, Mar. 11, 2022, 5 pages.

\* cited by examiner

METHOD FOR DYNAMICALLY COMPENSATING ANGLE ERRORS WHEN OPERATING A MACHINE TOOL, AND A MACHINE TOOL OPERABLE WITH SUCH A METHOD

CROSS-REFERENCE

This application claims the benefit of European application EP 21196271.7, filed Sep. 13, 2021, which is incorporated by reference.

The invention relates to a method for dynamically compensating angle errors when operating a machine tool, and to a machine tool operable with such a method.

It is known from the prior art that angle errors can occur when a machine tool is operated, in particular when extracting a tool from workpiece that has just been machined. Such angle errors can be the cause for chatter marks, or scoring, in the bores resulting in a degradation of the processing quality when machining the workpiece.

The cause for this is that a force acting along a Z-axis extending in a horizontal plane cannot be absorbed connection-free by the machine frame while accelerating or machining a workpiece. This results in an angle error in the vertical direction.

An object of an exemplary embodiment of the invention is to propose a method for dynamically compensating angle errors when operating a machine tool, and a machine tool operable with such a method, wherein the quality of the workpiece to be machined is improved.

This object is solved by a method for dynamically compensating angle errors when operating a machine tool that comprises at least one fixture for a workpiece, in or on which a workpiece can be secured, the at least one tool holder, in or on which a tool, in particular a drill, can be secured and can be rotationally driven by a rotational drive of the machine toolholder, the latter comprising at least one horizontal drive by which the toolholders—for purposes of machining the workpiece—can execute movements in at least one horizontal plane of the machine tool, the machine tool comprising at least one vertical drive by which the toolholder can execute movements in vertical direction of the machine tool, and the machine tool comprising at least one controller to which the rotational drive, the horizontal drive, and the vertical drive are functionally assigned, the method comprising the steps:

a. Advance the at least one rotationally driven tool to machine the workpiece into the workpiece along an advancing direction extending in the horizontal plane or diagonally to the horizontal plane;
b. Extract the rotationally driven tool from the workpiece along an extraction direction opposite to the advancing direction, and detecting an ACTUAL position of the toolholder in the vertical direction and an actual value of the force and/or acceleration pilot control of the tool in reference to a Z-axis extending in the horizontal plane;
c. Determine an angle error of the tool as a function of the actual value of the force and/or acceleration pilot control value of the tool in reference to the Z-axis extending in the horizontal plane;
d. Determine a compensation value of the toolholder in vertical direction to compensate the determined angle error and transition the toolholder from the ACTUAL position to a TARGET position by the determined compensation value.

Because an angle error of the tool can be determined as a function of the force and/or acceleration pilot control value of the tool in reference to the Z-axis extending in the horizontal plane, and a compensation value can be determined from this, and the toolholder can be adjusted from the ACTUAL position to a TARGET position by the determined compensation value, the angle error can be compensated by moving the toolholder. This reduces damage to the workpiece caused by the tool, in particular the risk of generating so-called chatter marks, or scoring.

The angle error determined for the tool can be determined as a function of the force pilot control ACTUAL value of the tool and/or the acceleration pilot control ACTUAL value of the tool.

As a result, the connection of the tool can be determined in reference to the machine frame.

An angle error is defined as a deviation of the length axis of the tool from the Z-axis in the horizontal plane.

In order to facilitate processing the workpiece and executing the method in real time, it has been shown to be advantageous when the controller comprises at least one memory unit, in which at least one table, in which a plurality of table values can be stored, and/or a computational model by which the table values can be calculated, is stored, storable, and retrievable, wherein an angle error and/or a compensation value of the toolholder is mapped in the table or by the computational model, respectively, in vertical direction to a force and/or acceleration pilot control ACTUAL value of the tool in the direction of the Z-axis extending in the horizontal plane.

An angle error or a compensation value can be quickly and easily recorded by storing force and/or acceleration pilot control of the ACTUAL values of the tool and compensation values for the toolholder. Such a calculation is not necessary by maintaining a plurality of table values; the method or the individual method steps, respectively, can then be executed faster.

When a computational model can be stored in the memory unit, maintaining the plurality of table values can be omitted, and angle errors and/or the compensation value can be determined depending on the situation. As a result, the controller does not have to be trained first by generating and maintaining a plurality of table values, but can instead be operated immediately.

Additionally, a combination of both options is provided by an embodiment of the method, such that the computational model computes and stores the plurality of table values in the table. As a result, already calculated table values can be referenced without having to recalculate these; as a result, the toolholder can be controlled more rapidly to transition in the vertical direction.

A further embodiment of the method provides that the compensation value comprises a correction curve or a correction datum of the toolholder in vertical direction to compensate the determined angle error.

When the compensation value comprises a correction curve, a movement of the tool along the Z-axis can be immediately coupled with a movement of the toolholder and vertical direction.

When the compensation value comprises a correction datum of the toolholder in vertical direction, the compensation value can be incrementally calculated, in particular as a function of the position of the tool.

The force and/or acceleration pilot control ACTUAL value of the tool can be easily and cost-effectively recorded if the force and/or acceleration pilot control ACTUAL value of the tool can be recorded in the direction of the Z-axis extending in the horizontal plane is detectable by the controller from the data of the rotational drive and/or by a sensor device.

When the force and/or acceleration pilot control ACTUAL value of the tool can be recorded by the controller from data of the rotational drive, the machine tool can be upgraded in a compact manner, in particular no additional sensors need to be installed. When the force and/or acceleration pilot control ACTUAL value is recordable by a sensor device, the accuracy of the recorded data can be improved.

Additionally, combinations of detecting by the controller and detecting by the sensor device can be provided in embodiments of the method.

Additionally, the method can be easily and cost-effectively implemented when the ACTUAL position of the toolholder is recordable in vertical direction by the controller from the data of the vertical drive and/or by a sensor device.

Additionally or alternatively to the aforementioned exemplary embodiments, additional embodiments of the method can provide that an angle error of the tool is determined by the computational model or by the sensor device as a function of the force and/or acceleration pilot control ACTUAL value of the tool in relation to the Z-axis extending in the horizontal plane.

In such a case, the angle error can be calculated by the computational model or immediately by the sensor device as a function of the force and/or acceleration pilot control ACTUAL value of the tool. As described above, a force and/or acceleration pilot control ACTUAL value of the tool can also be mapped to the angle error in the table of the memory unit.

In order to improve the quality of the dynamic compensation of angle errors when operating a machine tool, it has been shown to be advantageous when the method comprises detecting an ACTUAL position of the tool in the horizontal plane.

The dynamic compensation of angle errors when operating the machine tool can be further improved in a further enhancement of the last-mentioned embodiment when the compensation value of the toolholder in vertical direction is additionally determined as a function of the recorded ACTUAL position of the tool in the horizontal plane.

In principal, it is conceivable that the machine tool exclusively comprises a single vertical drive. When the machine tool comprises several toolholders on which one tool each can be arranged, and that can travel together for the purpose of machining the workpiece, it has been shown to be advantageous when the machine tool comprises at least two vertical drives by which the toolholder can execute movements in the vertical direction of the machine tool, and when the recording of the ACTUAL position of the toolholder in vertical direction can be recorded by the controller from data of both vertical drives and/or by the sensor device.

Embodiments of the method are conceivable on which the machine tool is operable at a defined maximum machining speed at which the force and/or acceleration pilot control ACTUAL value of the tool is at a maximum, and/or can be operated with an adjustable machining speed at which the force and/or acceleration pilot control ACTUAL value of the tool is reduced in relation to the value at the maximum machining speed.

When the machine tool is operable with a defined maximum machining speed at which the force and/or acceleration pilot control ACTUAL value of the tool is at a maximum, the machining times of the workpiece are at a minimum. However, in such a case the incidental angle errors are at a maximum.

When the machine tool with an adjustable machining speed at which the force and/or acceleration pilot control ACTUAL value of the tool is reduced in relation to the value at maximum machining speed, the machining times of the workpiece are increased. However, the angle errors can be reduced in such a case.

Embodiments of the method are characterized by a one-time or periodic cycling of the method steps, wherein the periodic cycling in time intervals for renewed cycling of the method comprises less than one second, less than one half second, less than 1 ms.

Additionally, embodiments of the method are conceivable on which the toolholder is transitioned incrementally or continuously from the ACTUAL position by the determined compensation value to the TARGET position.

When the toolholder is transitioned incrementally from the ACTUAL position by the determined compensation value to the TARGET position, the toolholder can for example be transitioned from the ACTUAL position by the determined compensation value to the TARGET position when the tool switches from an advancing movement into the workpiece to a retraction movement from the workpiece.

When the toolholder is transitioned continuously from the ACTUAL position and the determined compensation value to the TARGET position, inertia effects during transition can be reduced.

Lastly, the object is solved by a machine tool having at least one fixture for a workpiece, in or on which a workpiece can be secured, the machine tool having at least one toolholder, in or on which a tool, in particular a drill, can be secured and can be rotationally driven by a rotational drive of the toolholder, the latter comprising at least one horizontal drive by which the toolholders—for purposes of machining the workpiece—can execute movements in a horizontal plane of the machine tool, the machine tool comprising at least one vertical drive by which the toolholder can execute movements in the vertical direction of the machine tool, and the machine tool comprising at least one controller to which the rotational drive, the horizontal drive, and the vertical drive are functionally assigned, wherein the machine tool is provided according to a method for dynamically compensating angle error according to any of the above features.

Further features, details, and advantages of invention can be taken from the enclosed claims, from the drawing illustrations, and the below description of a preferred embodiment of the method and the machine tool.

Figure 2:
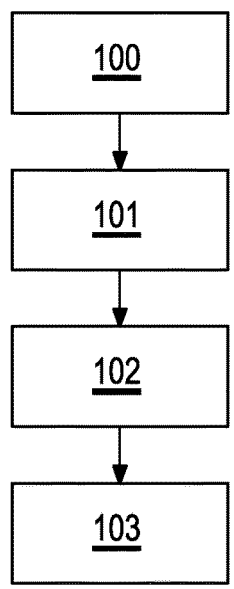

The drawing shows in:

FIG. 1 a schematic side cross-section view of a region of the machine tool;

FIG. 2 a schematic flow chart of an inventive method.

FIG. 1 shows a schematic representation of a machine tool in total labeled with the reference symbol 2 (only shown partially). The machine tool comprises a fixture 4 for a workpiece 6. The workpiece 6 is secured on the fixture 4. The machine tool 2 additionally comprises a toolholder 8, in which or on which a tool 10, in particular a drill, is secured. The tool 10 can be rotationally driven by a rotational drive 12 of the toolholder 8.

The machine tool 2 also comprises a horizontal drive 14 by which the toolholder 8 can—for the purpose of machining the workpiece 6—execute movements in at least one horizontal plane of the machine tool 2. The machine tool 2 also comprises a vertical drive 16 by which the toolholder 8 can execute movements in vertical direction of the machine tool 2.

Lastly, the machine tool 2 comprises a controller 18 to which the rotational drive 12, the horizontal drive 14, and the vertical drive 16 are functionally assigned.

The following is a description of the schematic flowchart shown in FIG. 2, in reference to FIG. 1:

In a first step 100, at least one rotationally driven tool 10 is—for purposes of machining the workpiece 6—advanced into the workpiece 6 along a direction of advance in a horizontal plane or diagonally to a horizontal plane.

The workpiece 6 is as a result machined by the tool 10. After the workpiece 6 is machined, the rotationally driven tool 10 is in a step 101 retracted from the workpiece 6 along a retract direction opposite to the direction of advance. The ACTUAL position of the toolholder 8 is as a result recorded in the vertical direction and a force and/or acceleration pilot control ACTUAL value of the tool 10 is recorded in relation to a Z-axis extending in the horizontal plane.

A then subsequent step 102 involves determining an angle error of the tool 10 as a function of the force and/or acceleration pilot control ACTUAL value of the tool 10 in relation to the Z-axis extending in the horizontal plane.

A then subsequent step 103 involves determining a compensation value of the toolholder 8 in vertical direction to compensate the determined angle error and transitioning the toolholder 8 from the ACTUAL position to a TARGET position by the determined compensation value.

The features disclosed in the above description, in the claims, and in the drawings, can individually and also in any combination be material for implementing the invention in its various embodiments.

LIST OF REFERENCE SYMBOLS

- 2 Machine tool
- 4 Fixture
- 6 Workpiece
- 8 Toolholder
- 10 Tool
- 12 Rotational drive
- 14 Horizontal drive
- 16 Vertical drive
- 18 Controller

The invention claimed is:

1. A method for dynamically compensating angle errors when operating a machine tool that comprises at least one fixture for a workpiece, in or on which the workpiece is securable, at least one toolholder, in or on which a tool is securable and can be rotationally driven by a rotational drive of the at least one toolholder, the rotational drive comprising at least one horizontal drive by which the at least one toolholder is able to execute movements in at least one horizontal plane of the machine tool, the machine tool further comprising at least one vertical drive by which the at least one toolholder is able to execute movements in a vertical direction of the machine tool, and at least one controller connected to the rotational drive, the at least one horizontal drive, and the at least one vertical drive, the method comprising the steps:

advancing the rotationally driven tool to machine the workpiece into the workpiece along an advancing direction extending in the at least one horizontal plane or diagonally to the at least one horizontal plane;

extracting the rotationally driven tool from the workpiece along an extraction direction opposite to the advancing direction, and recording an actual position of the at least one toolholder in the vertical direction and an actual value of a force and/or acceleration pilot control value of the rotationally driven tool in reference to a Z-axis extending in the at least one horizontal plane;

determining an angle error of the rotationally driven tool as a function of the actual value of the force and/or acceleration pilot control value of the rotationally driven tool in reference to the Z-axis extending in the at least one horizontal plane;

determining a compensation value of the at least one toolholder in the vertical direction to compensate the determined angle error and transitioning the at least one toolholder from the actual position to a target position by the determined compensation value.

2. The method according to claim 1, wherein the at least one controller comprises at least one memory unit, in which at least one table stores a plurality of table values, and/or a computational model by which the table values can be calculated, wherein the angle error and/or the compensation value of the at least one toolholder is mapped in the table or by the computational model, respectively, for the vertical direction to the actual value of the force and/or acceleration pilot control value of the tool in the direction of the Z-axis extending in the at least one horizontal plane.

3. The method according to claim 2, further comprising at least one of storing the table values in the table by manual entry, by executing a computational model, and/or by recording a specific actual angle error for a specific force and/or acceleration pilot control value, wherein the angle error and/or the compensation value of the at least one toolholder in the vertical direction is mapped in the table to at least one force and/or acceleration pilot control value of the tool in the direction of the Z-axis extending in the at least one horizontal plane.

4. The method according to claim 1, wherein the compensation value comprises a correction curve or a correction datum of the at least one toolholder in the vertical direction to correct the determined angle error.

5. The method according to claim 1, wherein the actual value of the force and/or acceleration pilot control value of the tool can be recorded by the controller in the direction of the Z-axis extending in the at least one horizontal plane from data of the rotational drive and/or by a sensor device.

6. The method according to claim 5, wherein the angle error of the tool is determined by the computational model or by the sensor device as a function of the actual value of the force and/or acceleration pilot control value of the tool in reference to the Z-axis extending in the at least one horizontal plane.

7. The method according to claim 1, wherein the actual position of the at least one toolholder can be recorded by the controller in the vertical direction from data of the vertical drive and/or by a sensor device.

8. The method according to claim 1, further comprising recording an actual position of the tool in the at least one horizontal plane.

9. The method according to claim 8, wherein the compensation value of the at least one toolholder in the horizontal direction is additionally determined as a function of the recorded actual position of the tool in the at least one horizontal plane.

10. The method according to claim 1, wherein the machine tool comprises at least two vertical drives by which the at least one toolholder can execute movements in the vertical direction of the machine tool and in that the recording of the actual position of the at least one toolholder in the vertical direction can be recorded by the controller from data of both of the at least two vertical drives and/or by a sensor device.

11. The method according to claim 1, wherein the machine tool is able to be operated at a defined maximum machining speed at which the force and/or acceleration pilot control value of the tool is at a maximum, and/or is operable with an adjustable machining speed at which the force and/or acceleration pilot control value of the tool is reduced in relation to the value at the maximum machining speed.

12. The method according to claim 1, wherein the method steps are run for a period of a one-time or a periodic cycling time, wherein the periodic cycling is run at a periodic cycle of less than one second, less than one half second, or less than 1 ms.

13. The method according to claim 1, wherein the at least one toolholder is transitioned incrementally or continuously from the actual position to the target position by the determined compensation value.

14. A machine tool comprising:
at least one fixture for a workpiece, in or on which the workpiece is securable,
at least one toolholder, in or on which a tool is securable and can be rotationally driven by a rotational drive of the at least one toolholder, the rotational drive comprising at least one horizontal drive by which the at least one toolholder can execute movements in at least one horizontal plane of the machine tool,
at least one vertical drive by which the at least one toolholder can execute movements in vertical direction of the machine tool, and
at least one controller to which the rotational drive, and the at least one horizontal drive, and the at least one vertical drive are functionally assigned, wherein the at least one controller being configured to dynamically compensate angle errors by being configured to:
advance the rotationally driven tool to machine the workpiece into the workpiece along an advancing direction extending in the at least one horizontal plane or diagonally to the at least one horizontal plane;
extract the rotationally driven tool from the workpiece along an extraction direction opposite to the advancing direction, and recording an actual position of the at least one toolholder in the vertical direction and an actual value of a force and/or acceleration pilot control value of the rotationally driven tool in reference to a Z-axis extending in the at least one horizontal plane;
determine an angle error of the rotationally driven tool as a function of the actual value of the force and/or acceleration pilot control value of the rotationally driven tool in reference to the Z-axis extending in the at least one horizontal plane; and
determine a compensation value of the at least one toolholder in the vertical direction to compensate the determined angle error and transitioning the at least one toolholder from the actual position to a target position by the determined compensation value.

* * * * *